United States Patent

Roberts et al.

Patent Number: 6,119,084
Date of Patent: Sep. 12, 2000

[54] ADAPTIVE SPEAKER VERIFICATION APPARATUS AND METHOD INCLUDING ALTERNATIVE ACCESS CONTROL

[75] Inventors: Tracy Roberts, Mountain View; Craig A. Will, Fremont, both of Calif.

[73] Assignee: Nortel Networks Corporation, Montreal, Canada

[21] Appl. No.: 08/999,086

[22] Filed: Dec. 29, 1997

[51] Int. Cl.$^7$ .................................................. G10L 9/08
[52] U.S. Cl. .......................... 704/246; 704/243; 704/244; 704/273
[58] Field of Search ..................... 704/243, 246, 704/273, 231, 244, 251; 379/88.02

[56] References Cited

U.S. PATENT DOCUMENTS

| | | | |
|---|---|---|---|
| 5,365,574 | 11/1994 | Hunt et al. | 704/246 |
| 5,517,558 | 5/1996 | Schalk | 704/246 |
| 5,548,647 | 8/1996 | Naik et al. | 704/200 |
| 5,698,834 | 12/1997 | Worthington et al. | 235/472.03 |
| 5,737,485 | 4/1998 | Flanagan et al. | 704/232 |

*Primary Examiner*—Susan Wieland
*Attorney, Agent, or Firm*—W. Glen Johnson

[57] ABSTRACT

A useful, novel, and nonobvious speech verification apparatus, method and media incorporating the same, as well as a secure interactive voice response ("IVR") system. The speaker verification apparatus and method involves a determination whether one or more speech samples captured from a speaker substantially matches a speaker template in a registration database. If no substantial match is found, alternate access control is utilized to allow the speaker to verify herself, without the use of speaker verification techniques. If alternative access control is able to verify the speaker, the captured speech samples are used to modify the corresponding speaker template. The so-modified speaker template may account for acoustic idiosyncrasies or anomalies perceived in the speech samples to improve verification rates in subsequent acoustic attempts.

30 Claims, 4 Drawing Sheets

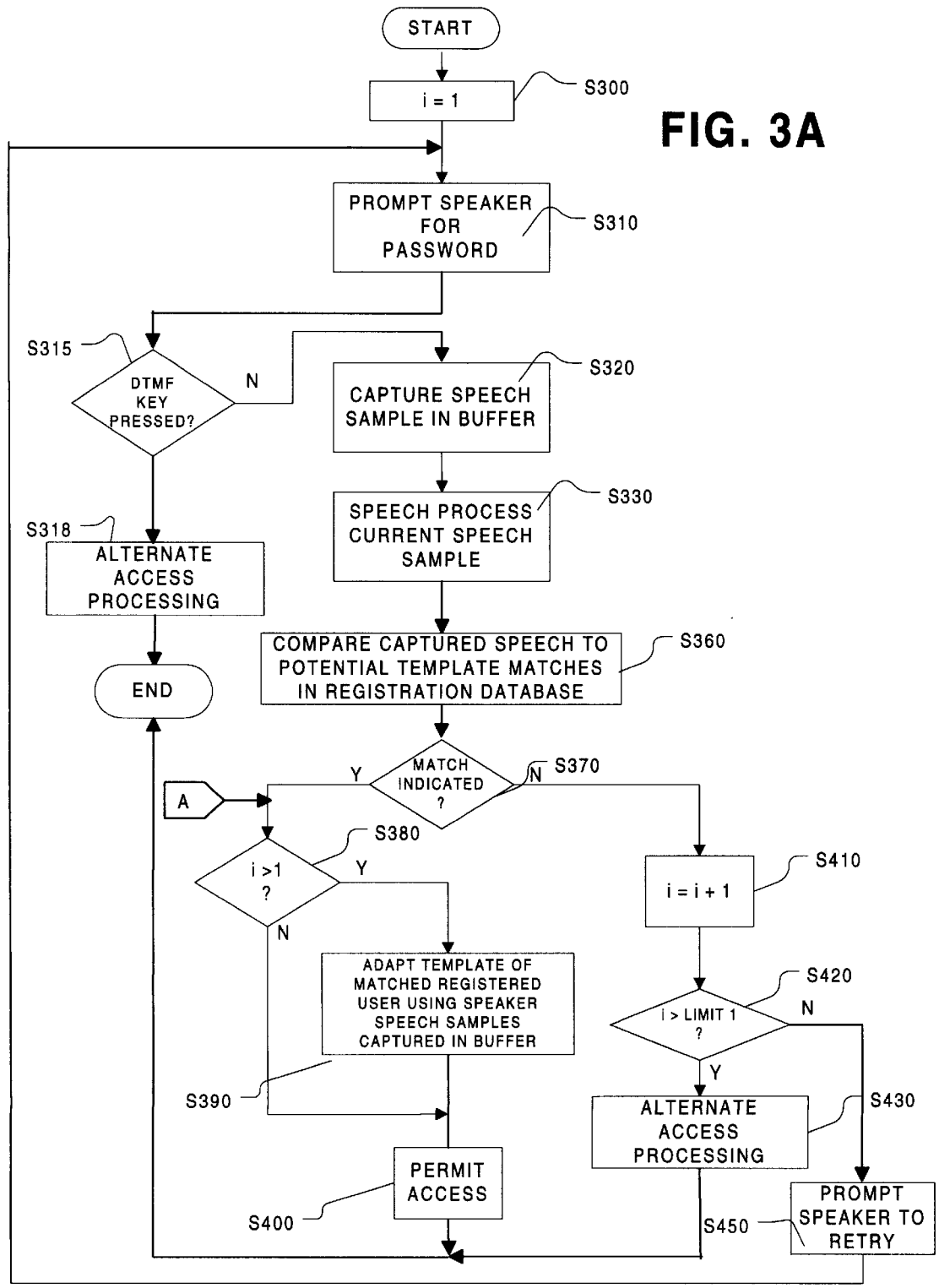

| | | |
|---|---|---|
| SPKR 1 | TEMPLATE 1 | TEMPLATE TEXT 1 |
| SPKR 2 | TEMPLATE 2 | TEMPLATE TEXT 2 |
| . | . | . |
| SPKR N | TEMPLATE N | TEMPLATE TEXT N |

ADAPTIVE SPEAKER VERIFICATION APPARATUS AND METHOD INCLUDING ALTERNATIVE ACCESS CONTROL

FIELD OF INVENTION

This invention is directed to speaker verification through analysis of captured speech samples, and is particularly concerned with improving speaker verification rates where the speaker requests verification in different acoustic environments.

DESCRIPTION OF THE RELATED ART

Interactive voice response ("IVR") systems often collect data in conjunction with a telephone call. The data may include information such as an account number or social security number. This data may be used to retrieve information from a secure server related to the caller.

Since the server data is typically confidential and/or personal in nature (e.g. bank records, credit rating, voice mail messages, etc.), most IVR systems implement an access control process to prevent unauthorized callers from gaining wrongful access to the server data and/or secure portions of the IVR system. In the past, this access control process typically involved the caller verifying her identity through keying in a series of DTMF digits (e.g. an authorization or personal identification "PIN" code) from her telephone keypad in response to appropriate prompts orchestrated by the access control process. While such keypresses and codes are easy to discern and verify, it is difficult for callers to always remember the correct sequence and may be inconvenient to punch it in, especially when one of the caller's hands is already being used to support the telephone handset.

This problem has been exacerbated by the influx of secure access home and office automation tools into the market place. Many of these require dissimilar types of authorization code sequencing. As result, users wishing secure access are faced with either committing a long list of authorization codes to memory, or carrying around PIN code cheat-sheets which undermines the security and ease-of-use features these tools allegedly offer.

In response, industry has sought alternative means to offer convenient yet secure access control. Since most IVR systems are telephony based, acoustic speaker verification appears to be a natural access control candidate. Such acoustic speaker verification, in which the speaker speaks a predetermined "password" word or phrase that is compared against a registration database of speaker templates, offers reasonably secure access control, especially when sophisticated template matching techniques are utilized. Moreover, the caller wishing to be verified need only do what comes naturally over the telephone (speak a predetermined password when prompted by the IVR system rather than attempt to punch in an authorization code on a keypad).

However, acoustic speaker verification has not been widely pursued as an access control technique because of difficulties faced in handling speech variations stemming from changing acoustic environments the speaker is speaking from, and even tone or pronunciation variations of the speaker herself. As defined herein, the acoustic environment includes the ambient environment in which the speaker resides, the perceivable background noise emanating from that environment, the voice acquisition and transmission quality of intervening communications equipment, and the like.

While conventional speaker identification algorithms are quite sophisticated in comparing captured speech samples to speaker templates, Applicants perceive the weak link to be conventional treatment of the speaker templates of the registration database. Heretofore, the speaker templates of the authorization or registration database remained static from their initial creation, or if modified, became largely unmodifiable after the first few verification iterations due to template convergence effects of known template modification techniques. Where the speaker template remains static, the speaker will always be compared against a speaker template created within a specific acoustic environment which may be acoustically dissimilar from which the speaker is currently calling from. Due to the inherent noise sensitivity of known speaker identification techniques, a registered speaker may be improperly denied access because the acoustic environment in which the pre-established password is spoken (e.g. a public phone in a crowded airport concourse) does not match the acoustic environment (e.g. a quiet branch office using a digital PBX extension) in which the template was created. Although several static templates can be defined for each registered speaker, accurate verification still relies in part on predicting what kind of environment the speaker will be calling from, which in practical terms becomes an arduous task in our increasingly mobile society.

As mentioned previously, conventional adaptive speaker verification techniques involve "near static" templates, since they are designed to quickly converge towards a template result typically after only four to eight verification operations from template creation. This is ostensibly done to circumvent long training or break-in periods otherwise required in obtaining reasonably accurate speaker verification rates. While improved over use of static speaker template comparison since some degree of adaptation is allowed, the caller still is required to call in from dissimilar acoustic environments early in the template definition and modification process in order to improve verification rates when calling from different acoustic environments.

Therefore, it would be desirable to provide a speaker verification apparatus or method which can adapt registered speaker templates to changing acoustic environments without the aforementioned convergence issues. It would also be desirable that a way be provided to verify the identity of the speaker through an alternative access control process when speaker identification fails due to present acoustic environment and/or changes in the speaker's voices. Finally, it would be desirable to provide an adaptive speaker verification apparatus or method that can be easily implemented in a wide range of secure automation tools and devices.

SUMMARY OF THE INVENTION

In accordance with these and related desires, the present invention is directed to a useful, novel, and nonobvious speech verification apparatus, method and media incorporating the same, as well as a secure interactive voice response ("IVR") system including such speech verification apparatus. Speaker verification according to the present invention involves a determination whether one or more speech samples captured from a speaker substantially matches a speaker template in a registration database. If no substantial match is found, alternate access control is utilized to allow the speaker to verify herself, potentially without the use of speaker recognition techniques. If alternative access control is able to verify the speaker, the captured speech samples are used to modify the corresponding speaker template. The so-modified speaker template may account for incorporate acoustic idiosyncrasies or anomalies perceived in the speech samples to improve verification rates in subsequent iterations.

Preferably, this alternative access process involves an interactive keypad or keyboard-based session that allows the speaker to communicate access information such as a password to the speaker verification apparatus or method without requiring further speech capture and template analysis. This feature is advantageous in that the speaker is presented with a familiar, if less desirable way to input access information that is significantly less dependent on the speaker's momentary voice characteristics or acoustic environment in which she is communicating.

Further, preferably, alternative access control should be able to verify the speaker using access information corresponding to converted speech to text versions of the templates stored in the registration database. This feature enhances verification ease-of-use since a common password or phrase can be used by the speaker for verification purposes, whether or not template matching is successful.

Further, according to speaker verification of the present invention, aforementioned template matching may include using a combination of speech recognition and acoustic speaker recognition techniques.

Other aspects and features of the present invention will become apparent to those ordinarily skilled in the art upon review of the following description of the specific preferred embodiments of the invention in conjunction with the accompanying figures.

BRIEF DESCRIPTION OF THE DRAWINGS

The features of the invention, as well as the invention itself may be best understood with reference to the following drawings, in which like numbers indicate like parts, to which:

FIGS. 3A and 3B are flowcharts illustrating speaker verification processing according to the first embodiment of the invention;

DETAILED DESCRIPTION OF THE PREFERRED EMBODIMENTS

In the following detailed description, references are made to the accompanying drawings which form a part hereof and in which is shown by way of illustration specific embodiments in which the invention may be practiced. These embodiments are described in sufficient detail to enable those ordinarily skilled in the art to practice the invention, and it is to be understood that other embodiments may be utilized and that structural, logical, and electrical changes may be made without departing from the spirit and scope of the present invention. The following detailed description is, therefore, not to be taken in a limiting sense, and the scope of the present invention is to be defined only by the appended claims.

Figure 1:
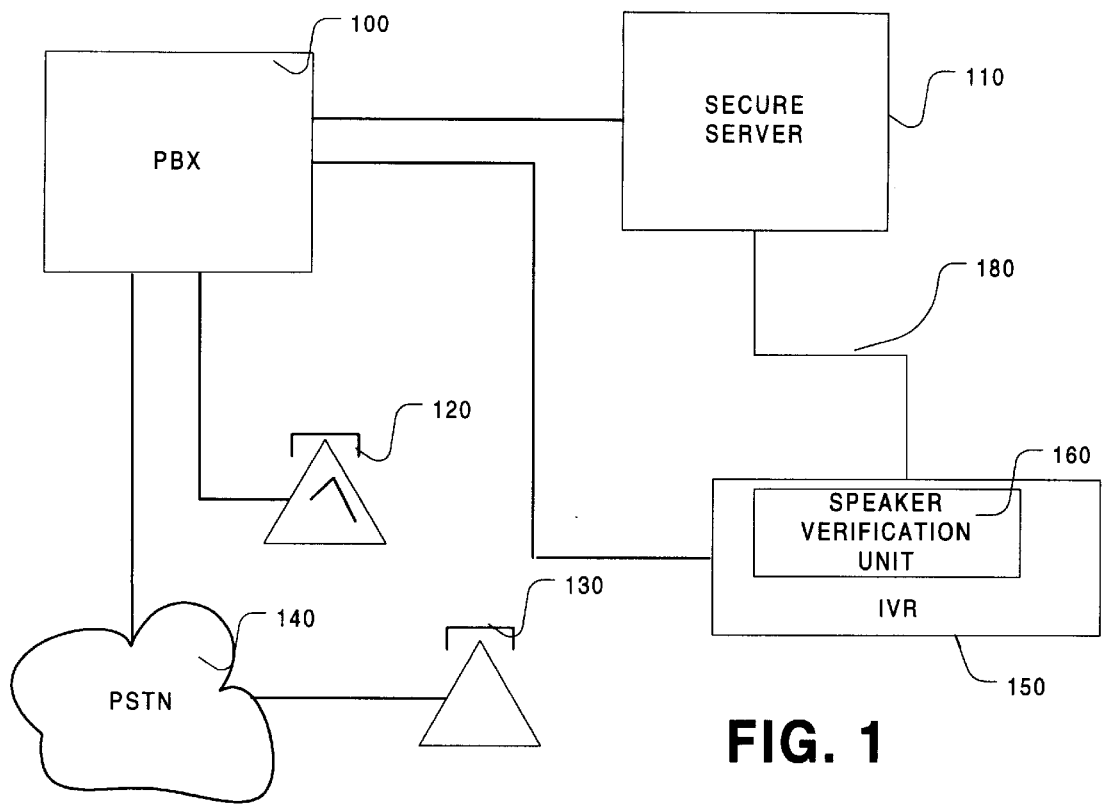
FIG. 1 is a block diagram of an interactive voice response system implementing speaker verification according to the first embodiment of the invention.

An interactive voice response system including the speaker verification unit according to the first embodiment of the invention is shown generally at 170 in FIG. 1. The system comprises a secure server 110 coupled to a telephone switch 100, such as a private branch exchange ("PBX") switch having an interface into the server 110 thereby enabling the server in the switch to communicate information identifying telephone connections in a known manner. In this embodiment, the switch preferably comprises a Nortel Meridian 1 Switch available through Northern Telecom Limited of Montreal, Quebec, Canada. The secure server 110 is also networked to the personal computer indicated at 150. The network 180 can be one of many commercially available networks, such as Ethernet, with higher level network software comprising Novell Netware or Microsoft NT, for example. Although not shown in the Figure, network 180 can be organized as a LAN or WAN with links to the Internet, as is well understood in the art.

The personal computer 150 is represented in block format for convenience, and herein comprises an industry standard general purpose digital computer including a processor, random access memory (RAM), and one or more secondary storage devices such as hard disk drives, CD ROMs, and diskettes. In addition, it contains a network card to establish a bi-directional communications link with the secure server 110 via the network 180. Secure server 110 may also be a standard personal computer, but usually has more secondary storage and RAM to enable it to store large amounts of data for the personal computer attached to it as well as information to which an incoming caller desires access. Both the server 110 and computer 150 store software and execute it on processors from RAM.

In the embodiment of FIG. 1, computer 150 comprises an interactive voice response ("IVR") system which may be a stand alone device which answers incoming calls from callers utilizing local digital extension 120 or remote telephone 130 coupled to PBX 100 through the Public Switched Telephone Network ("PSTN") 140. Alternatively, the computer 150 may comprise a single board computer installed within PBX 100 and/or secure server 110. In such case, it may have less memory and local storage options than a general purpose PC, but is more tightly integrated with the PBX and can more easily leverage PBX resources, so that it can still implement the IVR system including the speaker verification unit 160 according to the present embodiment.

It should be realized here that local digital extension 120 as well as remote telephone 130 comprise conventional telephony devices having both voice and at least dual tone multi-frequency (DTMF) signaling capabilities initiated through depression of one or more keys of a conventional DTMF keypad disposed on each, as is well understood in the art. Accordingly, further description is omitted herein.

The IVR system collects caller/user input and sends user information to the secure server 110. Computer 150 also includes a speaker verification unit 160 according to the present embodiment for verifying the identity of the caller calling in from either remote telephone 130 or local extension 120 to access confidential or sensitive information on the secure server 110 and/or computer system 150 implementing the IVR response system.

In this embodiment, the speaker verification unit 160 preferably comprises modules or units of programming instructions residing in computer 150 memory that, when executed by the processor of computer 150, carries out speaker verification procedures of the present embodiment described below with respect to FIGS. 2 and 3A and 3B. The program statements defining the speaker verification unit 160 are usably embodied in a computer-readable medium, such as the aforementioned hard disk drive, CD-ROM diskette or other storage media (whether accessible locally or remotely through network 180) or the aforementioned RAM, as is well understood in the art. In other embodiments, the speaker verification unit can also be implemented by the preparation of application specific integrated circuits or by interconnecting an appropriate network of conventional hardware components, devices and circuits or a combination of hardware and software components as will be apparent to those ordinarily skilled in the art.

Figure 2:
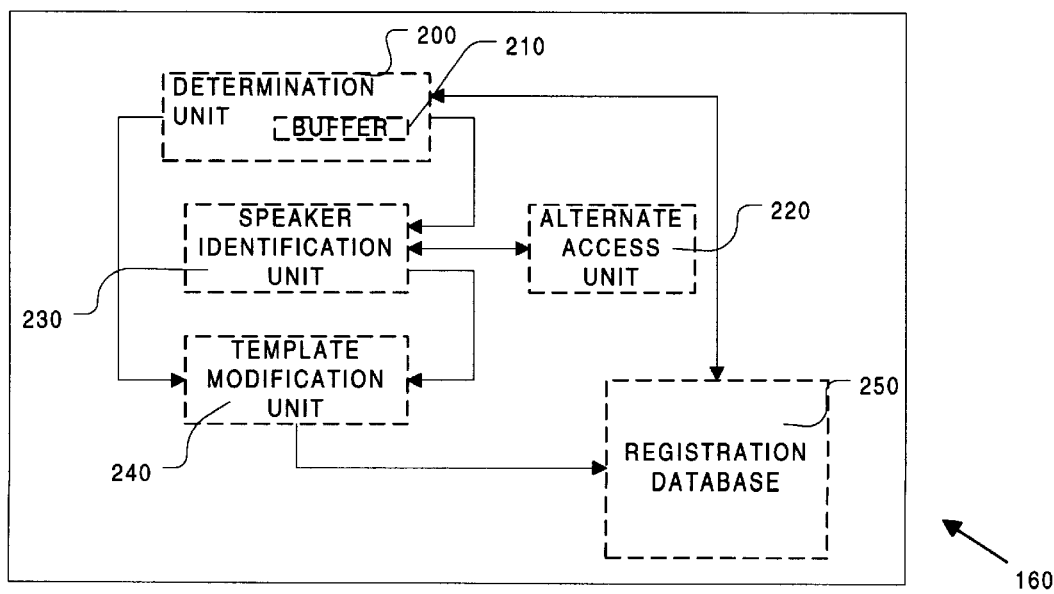
FIG. 2 is a block diagram of programming code (or the equivalent) running on the IVR computer shown in FIG. 1.

Further detail of the programming code structure comprising the speaker verification unit 160 of FIG. 1 is shown in block diagram form in FIG. 2. As is previously stated, such programming code is preferably executed by a processor in computer 150 out of RAM. Thus, the blocks in FIG. 2 may be loosely thought of as portions of the RAM. However, it is to be understood by those skilled in the art that code modules comprising the programming code may be stored anywhere in RAM or similar computer readable medium locally or remotely accessible to the computer system 150, and the functions may be distributed in many different ways within modules without departing from the teachings of the invention.

As shown in FIG. 2, the speaker verification unit according to the present embodiment includes a determination unit 200 for capturing speed samples acquired from the user and storing them into a temporary buffer 210. Using the buffered and captured samples, stored in buffer 210, the determination unit 200 communicates with the registration database 250 and compares the captured speech samples stored in buffer 210 against the speech templates contained in the registration database 250. Based on the results of the comparison, the determination unit will either permit caller entry to the secure server 110-IVR system 150 or issue a request to the speaker identification unit 230 to perform alternate verification (non-speech based) verification of the calling party using alternate access unit 220.

Figures 4, 5:
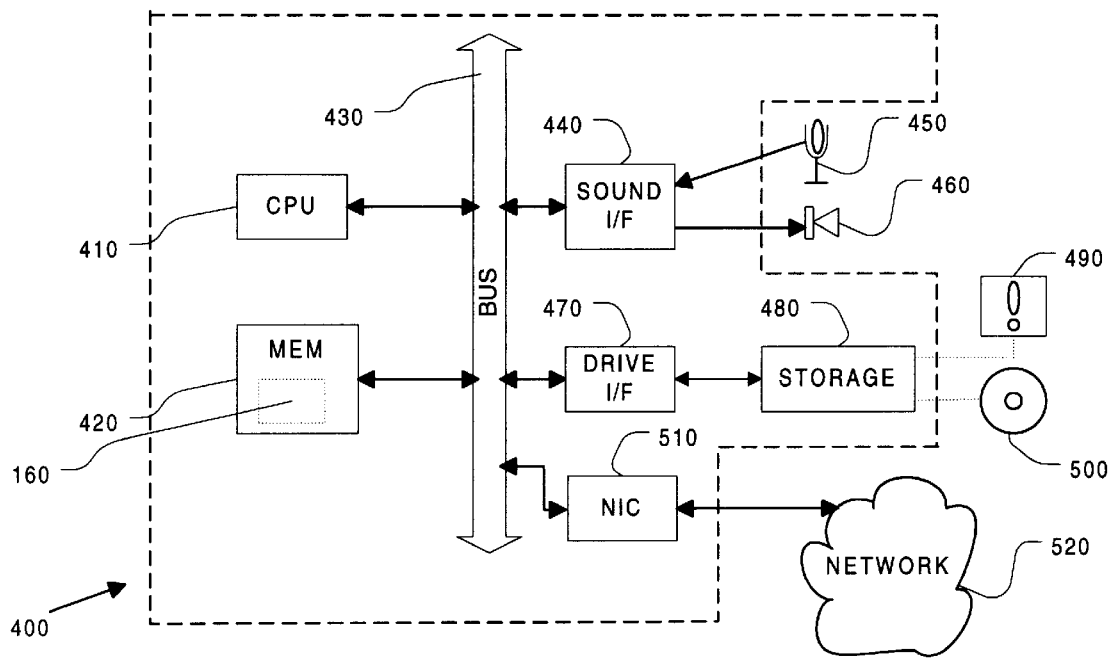
FIG. 4 is a block diagram of portable information processor implementing speaker verification according to a second embodiment of the invention.
FIG. 5 diagrammatically illustrates the registration database shown in FIG. 2.

The template modification unit 240 preferably provides code programming instructions for the processor of computer 150 to selectively modify template entries in the registration database 250 based on the captured speech samples contained in buffer 210 when the speaker is verified through either determination unit 200 processing or speaker identification unit 230 processing in conjunction with alternate access unit 220. Turning briefly to FIG. 5, FIG. 5 is a block diagram depicting the internal organization of the registration database 250 according to the first embodiment of the invention. Each entry 550 of the database 250 includes registered speaker information 560 as well as a speech template 570 and template text conversion data 580 as indicated in the figure. Here, preferably, template 510 of each database entry 550 comprises a model that an incoming speech segment is compared against to determine if the speaker of the incoming segment is likely to be the same speaker that initially created the template. Speaker verification is well known in the art, and although there are many variations, speech verification systems have a core similarity. In the usual situation, the user articulates a number (generally three to eight) of distinct examples of the word or phrase used as a password. The password is preferably a relatively long word or a phrase so as to ensure sufficient information and redundancy. Appropriate signal processing is done on the articulation so as to extract the desired acoustic features. Then, an appropriate selection is made of those features that are desirable. Finally, a pattern classifier is defined to integrate the selected features into a particular space. A threshold is then determined that allows the system to separate the appropriate space into two categories: "Accept" (the new incoming example is likely to be from the speaker who created the model) or "Reject" (the new incoming example is unlikely to be from that speaker). Many variations are possible for implementing the feature extraction, feature selection, and classification. A Fast Fourier Transform can be performed that provides a matrix of signal energy levels for a number of frequency bands (e.g., eight) crossed by time (e.g., every 15 mS). A model template could thus be created by simply averaging these values across all of the samples, and then using an algorithm that sums the differences between energy levels for each element of the matrix to result in a single numerical score reflecting the quality of the match. A threshold is then selected, using the variations among the training samples as a guide to expected variation. More sophisticated systems may use speech features such as pitch that require additional levels of processing and may use decision criteria that weight different speech features differently. Some systems may use neural networks for the classification and feature selection stages, with either conventional feature extractors or neural network feature extractors used. Neural networks have the advantage that a learning algorithm (e.g., backward propagation) is used to automatically create a general model, given a set of examples. A neural network also has the ability to determine optimum differential weightings for different features and to do this weighting with higher-order factors, not just linear.

Although not shown in the FIG. 5, each registered speaker may have a plurality of speaker templates and associated template text defined in the registration database 250.

Figure 3B:
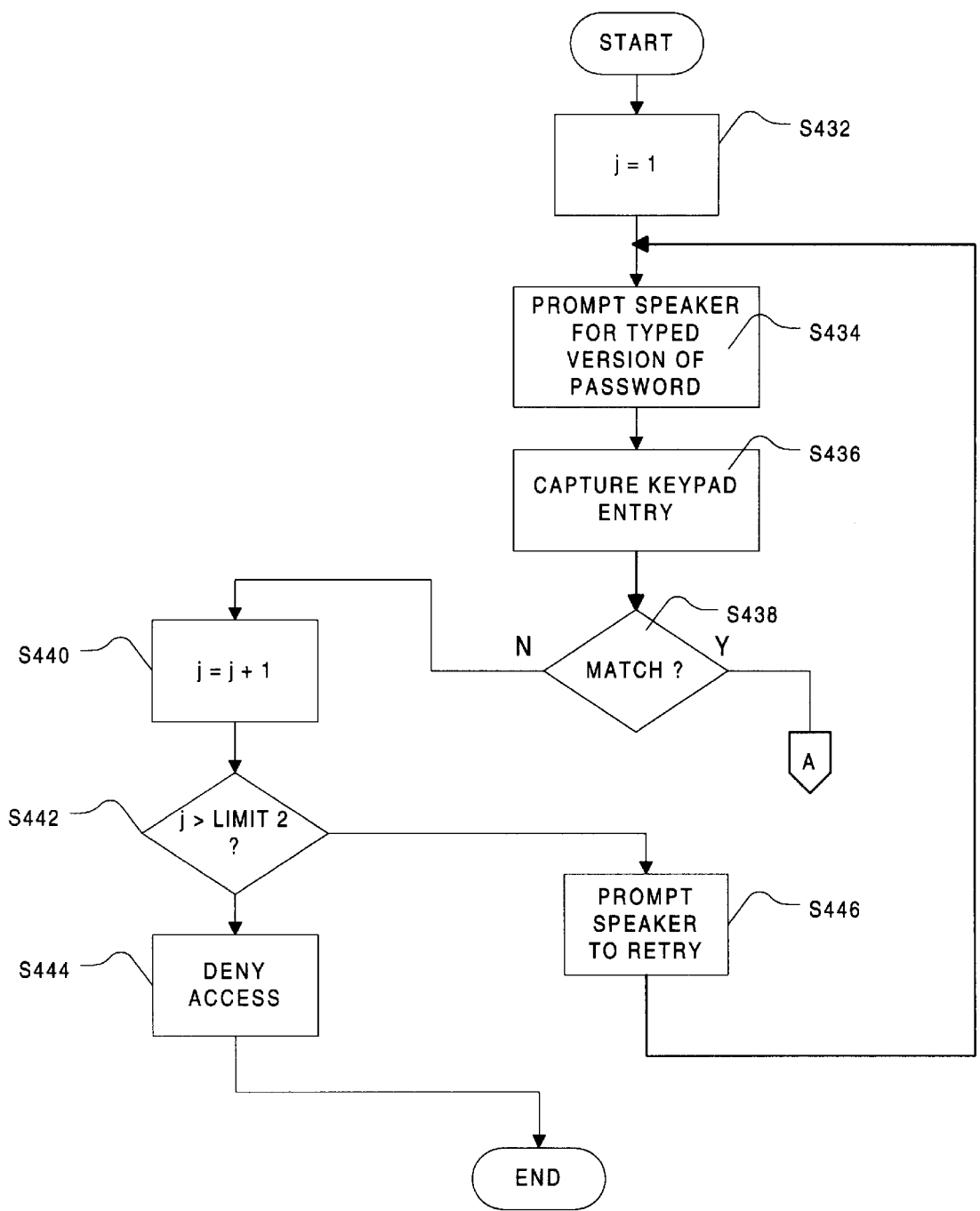

FIGS. 3A and 3B are related flowcharts detailing speech verification processing carried out by the speech verification unit 160, including the determination unit 200, the speaker identification unit 230, the alternate access control unit 220, and the template modification unit 240 components thereof, according to the first embodiment of the invention. Referring first to FIG. 3A, speech verification processing according to the present embodiment begins at step S300 wherein an iteration index i is initialized. The iteration index is used to track the number of times the speaker has attempted speaker verification using a spoken pre-established password. Control thereafter passes to step S310 in which the speaker or caller is prompted for the pre-established password.

Control thereafter passes to step S315 in which a determination is made as to whether the user has depressed a DTMF key (indicating she wants to bypass acoustic speaker verification). If so, control passes to step S318, in which alternate access control processing procedures are invoked using alternate access control unit 220 and as detailed herein below with reference to FIG. 3B. Control thereafter terminates naturally. Otherwise, control passes to step S320, in which the speech sample preferably consisting of a word, phrase or utterance is stored in the determination unit buffer 210. Thereafter in step S330, the speech sample stored is in buffer 210 including the current speech sample just captured in step S320 is recognition processed using known speaker-dependent or speaker-independent speech recognition techniques. It should be recognized that the speech recognition processing step S330 here serves as a first pass filtration mechanism used to isolate those entries 550 in the registration database 250 whose speaker templates 510 are phonemically similar to the captured speech sample. This first pass greatly reduces the pool of potential registration database speaker templates 510 which must be compared against the captured speech sample using below-described speaker verification techniques which, in turn, greatly simplifies processing and improves performance over known single-pass verification techniques.

Still referring to FIG. 3A, control thereafter passes to step S360. In step S360, the speech verification unit 160 of the present embodiment compares the current captured speech samples to the templates isolated during the aforementioned speech recognition step S330 using known speaker verification techniques. As is well understood in the art, such speaker verification techniques can be used to generate confidence levels associated with each captured speech sample-speaker template comparison. Also, although not preferred, conventional speaker identification techniques could be used to generate these confidence match levels. Then, the speech verification unit 160 will select the closest match based on the so-generated confidence levels and threshold it against a predetermined threshold to determine whether in fact verification has occurred.

Control thereafter passes to step S370 in which the determination is made whether a template match has been found. If no match has been found, control passes to step S410, in which the iteration counter (i) is incremented and then control passes to step S420. At step S420, a determination is made whether the incremented iteration counter exceeds the preferably pre-established limit for allowing speaker verification attempts. If that limit has been exceeded, meaning in this embodiment that the caller has used up his chances for gaining access through acoustic speech verification, control passes to step S430. At step S430, the speech verification unit undertakes alternate access processing as specified in the alternate access control unit 220 (FIG. 2) and as detailed below with reference to the flow diagram of FIG. 3B. Control thereafter terminates naturally.

If, however, in step S420, the determination is made that the incremented iteration index does not exceed the pre-established limit, indicating that the caller has not yet squandered his chances for speaker verification, control instead passes to step S450 in which the speaker is notified that the speech verification unit 160 is unable to verify her identity based on the captured speech samples and to instruct the speaker to retry speaking the pre-established password. Control thereafter leaps back to step S310, in which the speaker verification unit again issues a request prompting the speaker for the pre-established password.

If, however, in step S370, a determination has made that a template match has been indicated using the aforementioned speaker identification techniques, control instead passes to step S380. In step S380, the status of the iteration counter is queried to see whether more than one set of speech samples has been stored in the buffer 210 of the determination unit 200 shown in FIG. 2. In this embodiment, if at least two distinct speech samples are captured in the buffer 210, control passes to step S390, in which the speaker template found a match the current speech sample is modified using the speech samples stored in buffer 210.

According to the present embodiment, the template or templates of the matched registered user will be modified by the captured speech samples by one of a variety of methods. One method is simply to recompute the model using the existing samples and the new sample pooled together, as if all samples were present at the initial time of registration. Since this is typically computationally intensive, this is typically done by queuing up the samples and performing the processing when there is no load on the computer 150 processor from ongoing calls. Other methods use feature extraction algorithms that create a standard set of parameters for each sample, and maintain a template that consists of the "average" set of parameters for all samples, and where it is easy to modify the template by (for example, recomputing a mean) using only the parameters and not having to redo the signal processing for all of the original samples. Note that if more than one reference template has been defined for a particular individual, the template with the closest match is chosen to be modified.

Once template modification in step S380 has been performed, control within the speaker verification unit 160 passes to step S400 in which access is granted to the secure areas of the IVR system executing on computer 150 or the secure server 110 as identified in FIG. 1. Control thereafter terminates naturally.

If, however, a determination is made in step S380 that the iteration index counter is 1, meaning that the only one speech sample is contained in the buffer 210, control instead passes to step S400 without the aforementioned template modification being performed. This is because a successful match was made the first time, suggesting that the matched speaker template accounts for present acoustic environment the registered speaker is speaking from. Control thereafter terminates naturally.

Referring now to FIG. 3B, FIG. 3B is a flow diagram illustrating an example access control process carried out by the speech verification unit 160 of the present embodiment. When alternate access processing is requested in step S430 (FIG. 3B) control begins at step S432 in which a second iterative index counter is initialized. This second iterative counter (i) is used to trace the number of times that the speaker has attempted verification through the alternative access control technique.

Control thereafter passes to step S434, in which the speaker is prompted for a typed version of the pre-established password by prompting the speaker therefor. By accepting a typed version of the pre-established password, the speaker need only remember one password in order to gain access to the secure areas of the server 110 and/or the IVR system executing on computer system 150 through either access control process.

Control thereafter passes to step S436 in which the speaker verification unit 160 attempts to capture keypad entry performed by the caller on the DTMF keypad associated with the extension 120 or phone 130 (FIG. 1) that the caller is using. Control thereafter passes to step S438. At step S438, a determination is made whether the captured key pad entries, preferably comprising a DTMF sequence, match template text values 580 contained in the registration database. In this embodiment, the DTMF tone sequences are converted into their corresponding alphanumeric combinations and then these combinations are compared against the template text values 580 stored in the registration database in order to perceive a match. If template text matching the keypad entry is not found in the registration database, control passes to step S440, in which the second iteration counter is incremented and control passes to step S442. In step S442, the determination is made whether the caller has exceeded a preferably predetermined number of attempts for keying in the typed version password. This limit should be less than the speaker verification attempt limit described to increase security. If the limit has been exceeded, control passes to step S444, wherein the caller is denied access and processing by the speaker verification unit terminates naturally.

If, however, in step S442 a determination is made that the second iteration index counter has yet to exceed the predetermined attempt limit, control instead passes to step S446 wherein a message is relayed to the speaker to retry typing in the registered password. Control is thereafter passes to step S434 in which the speaker is prompted for typing in the version of the pre-established password and keyboard capture is again attempted as described hereinabove.

If, however, in step S438 it is determined that a match has been made, control jumps to step S380 (FIG. 3A). If, in step S380, it is determined that the first iterative index (i)>1, it is presumed that at least one prior acoustic speaker verification iteration had been attempted without success. Accordingly, control passes to step S390 where the captured speech sample or samples stored in buffer 210 are used to modify the speaker template(s) defined for the registered speaker, identified in step S438. It should be noted that the captured speech samples failing acoustic verification will be used to alter the speech template of this registered speaker to accommodate the noise or acoustic anomalies perceived in the captured speech samples to improve future verification rates. Control then passes to step S400, in which the user is permitted access to the secure areas of the IVR system of computer 150 or the secure server 110. Thereafter, speech verification processing according to the present embodiment terminates naturally.

If, however, in step S380 it is determined that i=1, it is presumed that the user has bypassed acoustic speaker verification according to the present embodiment and has instead chosen to verify exclusively through the alternate access control procedures. Since the speaker was successfully identified in step S438 without acoustic verification being attempted, control passes to step S400 directly without the need for speaker template modification discussed hereinabove. Thereafter, speech verification processing according to the present embodiment terminates naturally.

FIG. 4 depicts a block diagram of portable information processor 400 such as a multimedia laptop computer or personal digital assistant ("PDA") implementing speaker verification according to a second embodiment of the invention. Information processor 400 includes bus 430, CPU 410 coupled to bus 430, primary memory 420 coupled to bus 430, sound interface 440 in communication with bus 430 and also being coupled to microphone 450 and speaker 460, and drive interface 470 in communication with bus 430 and also being coupled to secondary storage drive 480 capable of accessing data and instructions stored on a hard disk, or removable media such as floppy 490 and CD-ROM 500. Information processor also includes network interface 510 coupled to bus 430 for interconnecting the information processor 400 to a network 520, such as LAN, WAN or the Internet.

In this embodiment, bus 430, CPU 410, memory 420, sound interface 440, microphone 450, speaker 460, drive interface 470, secondary storage drive 480, floppy 490, CD-ROM 500, and network interface 510 are conventional computer components generally known in the art. Thus, such components will not be further described herein except as to amplify upon the principles of the present invention.

In this embodiment, like the previous embodiment, the operational components defining the speaker verification unit 160 are carried out by a central processing unit 410 executing corresponding instructions in memory 420, which preferably comprises RAM or EEPROM. In fact, those speech verification unit 160 components shown and discussed hereinabove with reference to the memory map of FIG. 2 and whose operations are detailed hereinabove with respect to FIGS. 3A and 3B will be preferably incorporated into the memory 420 of the present embodiment. Alternatively, these speech verification components may be usably embodied in a removable or fixed computer-readable medium such as CD-ROM 500, a hard disk, or floppy disk 490 located within information processor 400 or accessible thereto via network 520.

Unlike the first embodiment, speech samples can be captured directly from the speaker using microphone 450 and sound interface 440, and prompts can be directly issued to the speaker using acoustic speaker 460. Moreover, the speaker verification unit, as part of the portable information processor 400, can be carried to the acoustic environment in which the speaker seeking verification to secure access to the processor 400, thereby reducing the chances for transmission anomalies from interfering with the verification process.

While the invention is described above in terms of specific preferred embodiments and associated drawings, those of ordinary skill in the art will recognize that the invention can be practiced in other embodiments as well. It is felt therefore that the invention should not be limited to the disclosed embodiments, but rather should be limited only by the spirit and scope of the appended claims.

What is claimed is:

1. A method for verifying a speaker of a captured speech sample, comprising the steps of:
   determining whether the captured speech sample substantially matches a speaker template in a registration database corresponding to a registered speaker; and
   performing the following steps if it is determined that the captured speech sample fails to substantially match any of the speaker templates in the template database, the steps comprising:
      selectively identifying the speaker of the captured speech sample as one of the registered speakers using an alternative access process; and
      modifying a selected one of the speaker templates in the template database corresponding to the registered speaker identified in said identifying step based on the captured speech sample.

2. The method of claim 1, wherein the alternative access process is a non-speech-based access process.

3. The method of claim 2, wherein the non-speech access process comprises an interactive, keypad-based process.

4. The method of claim 3, wherein
   unique access information is defined for each registered speaker; and
   wherein the interactive, keypad-based process comprises the steps of:
      issuing the speaker of the captured speech sample a prompt for access information;
      receiving keypad data;
      comparing the received keypad data against the access information for any of the registered speakers; and
      selectively identifying the speaker of the captured voice sample as one of the registered speakers based on comparison results obtained in said comparing step.

5. The method of claim 4, wherein the access information defined for at least a first one of the registered speakers is phonemically related to the speaker template corresponding thereto.

6. The method of claim 4, further comprising repeating said issuing, receiving, comparing and identifying steps of the interactive, keypad-based process until the first of:
   a predetermined limit of prompts have been issued to the speaker of the captured voice sample; and
   the speaker of captured voice sample has been identified in said identifying step based on the comparison results obtained in said comparing step.

7. The method of claim 1, wherein the captured speech sample comprises a plurality of speech samples.

8. The method of claim 1, wherein said determining step determines whether the captured speech sample substantially matches one of the speaker templates using a speech recognition process.

9. The method of claim 8, wherein said determining step determines whether the captured speech sample substantially matches one of the speaker templates using an acoustic speaker verification process in tandem with the speech recognition process.

10. An adaptive speaker verification method, comprising the steps of:

capturing a speech sample;

determining whether the captured speech sample substantially matches a speaker template in a registration database corresponding to a registered speaker; and performing the following steps if it is determined that the captured speech sample fails to substantially match any of the speaker templates in the template database, the steps comprising:

selectively identifying the speaker of the captured speech sample as one of the registered speakers using an alternative access process; and modifying a selected one of the speaker templates in the template database corresponding to the registered speaker identified in said identifying step based on the captured speech sample.

11. The method of claim 10, wherein the alternative access process is a non-speech-based access process.

12. The method of claim 11, wherein the non-speech access process comprises an interactive, keypad-based process.

13. The method of claim 12, wherein unique access information is defined for each registered speaker; and wherein the interactive, keypad-based process comprises the steps of:

issuing the speaker of the captured speech sample a prompt for access information;

receiving keypad data;

comparing the received keypad data against the access information for any of the registered speakers; and selectively identifying the speaker of the captured voice sample as one of the registered speakers based on comparison results obtained in said comparing step.

14. The method of claim 13, wherein the access information defined for at least a first one of the registered speakers is phonemically related to the speaker template corresponding thereto.

15. The method of claim 13, further comprising repeating said issuing, receiving, comparing and identifying steps of the interactive, keypad-based process until the first of:

a predetermined limit of prompts have been issued to the speaker of the captured voice sample; and the speaker of captured voice sample has been identified in said identifying step based on the comparison results obtained in said comparing step.

16. The method of claim 10, wherein the captured speech sample comprises a plurality of speech samples.

17. The method of claim 10, wherein said determining step determines whether the captured speech sample substantially matches one of the speaker templates using a speaker dependent speech recognition process.

18. The method of claim 17, wherein said determining step determines whether the captured speech sample substantially matches one of the speaker templates using an acoustic speaker verification process in tandem with the speech recognition process.

19. An article of manufacture for use in a computer system capable of recognizing a speaker of a captured speech sample, the article of manufacture comprising a computer usable medium including:

computer readable program code embodied in the computer useable medium for causing the computer to determine whether a captured speech sample substantially matches a speaker template in a registration database corresponding to a registered speaker;

computer readable program code embodied in the computer useable medium for causing the computer to selectively identify the speaker of the captured speech sample as one of the registered speakers using an alternative access process if it is determined that the captured speech sample fails to substantially match any of the speaker templates in the template database; and computer readable program code embodied in the computer useable medium for causing the computer to modify a selected one of the speaker templates in the template database corresponding to the identified registered speaker based on the captured speech sample if it is determined that the captured speech sample fails to substantially match any of the speaker templates in the template database.

20. The article of manufacture of claim 19, wherein the alternative access process is a non-speech-based access process.

21. The article of manufacture of claim 20, wherein the non-speech access process comprises an interactive, keypad-based process.

22. The article of claim 19, wherein unique access information is defined for each registered speaker; and wherein the access information defined for at least a first one of the registered speakers is contextually-related to the speaker template corresponding thereto.

23. The article of manufacture of claim 19, wherein the captured speech sample comprises a plurality of speech samples.

24. The article of manufacture of claim 19, further comprising computer readable program code embodied in the computer useable medium for causing the computer to determine whether the captured speech sample substantially matches one of the speaker templates using a speech recognition process.

25. The article of manufacture of claim 19, further comprising computer readable program code embodied in the computer useable medium for causing the computer to determine whether the captured speech sample substantially matches one of the speaker templates using an acoustic speaker verification process in tandem with the speech recognition process.

26. The article of manufacture of claim 19, further comprising computer readable program code embodied in the computer usable medium for causing the computer to perceive and capture a speech sample from the speaker.

27. A speaker verification apparatus, comprising:

a processor; and a memory in communication with said processor, said memory comprising:

computer readable program code for causing the processor to determine whether a captured speech sample substantially matches a speaker template in a registration database corresponding to a registered speaker;

computer readable program code for causing the processor to selectively identify a speaker of the captured speech sample as one of the registered speakers using an alternative access process if it is determined that the captured speech sample fails to substantially match any of the speaker templates in the template database; and computer readable program code for causing the processor to modify a selected one of the speaker templates in the template database corresponding to the identified registered speaker based on the captured speech sample if it is determined that the captured speech sample fails to substantially match any of the speaker templates in the template database.

28. The speaker verification apparatus of claim 27, further comprising a speech capture unit coupled to said processor for perceiving and capturing speech.

29. A speaker verification apparatus, comprising:

a memory including a registration database capable of storing speaker template data for a plurality of registered speakers;

a determination unit in communication with said database to determine whether a captured speech sample substantially matches a speaker template in the registration database;

a speaker identification unit in communication with said database and responsive to said determination unit to selectively identify a speaker of the captured speech sample as one of the registered speakers using an alternative access process if said determination unit determines that the captured speech sample fails to substantially match any of the speaker templates in said database; and a template modification unit in communication with said database and responsive to said determination and speaker identification units, said template modification unit modifying a selected one of the speaker templates in said database corresponding to the registered speaker identified by said speaker identification unit based on the captured speech sample if said determination unit determines that the captured speech sample fails to substantially match any of the speaker templates in said database.

30. A secure interactive voice response system, comprising:

a speech capture unit for perceiving and capturing speech; and a speaker verification apparatus, comprising:

a memory including a registration database capable of storing speaker template data for a plurality of registered speakers;

a determination unit in communication with said database to determine whether a captured speech sample substantially matches a speaker template in the registration database;

a speaker identification unit in communication with said database and responsive to said determination unit to selectively identify a speaker of the captured speech sample as one of the registered speakers using an alternative access process if said determination unit determines that the captured speech sample fails to substantially match any of the speaker templates in said database; and a template modification unit in communication with said database and responsive to said determination and speaker identification units, said template modification unit modifying a selected one of the speaker templates in said database corresponding to the registered speaker identified by said speaker identification unit based on the captured speech sample if said determination unit determines that the captured speech sample fails to substantially match any of the speaker templates in said database.

* * * * *